US009749802B2

(12) United States Patent
Cui

(10) Patent No.: US 9,749,802 B2
(45) Date of Patent: Aug. 29, 2017

(54) METHOD, APPARATUS, AND TERMINAL DEVICE FOR DETERMINING USER ACTIVITY RANGE

(71) Applicant: Tencent Technology (Shenzhen) Company Limited, Shenzhen, Guangdong (CN)

(72) Inventor: Yingren Cui, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/983,309

(22) Filed: Dec. 29, 2015

(65) Prior Publication Data

US 2016/0150378 A1 May 26, 2016

Related U.S. Application Data

(63) Continuation of application No. PCT/CN2015/071232, filed on Jan. 21, 2015.

(30) Foreign Application Priority Data

Jan. 23, 2014 (CN) .......................... 2014 1 0030799

(51) Int. Cl.
H04W 4/02 (2009.01)
H04W 64/00 (2009.01)
(Continued)

(52) U.S. Cl.
CPC ............... *H04W 4/027* (2013.01); *G01S 5/02* (2013.01); *G01S 19/14* (2013.01); *G01S 19/39* (2013.01);
(Continued)

(58) Field of Classification Search
CPC ....... H04W 4/027; H04W 4/02; H04W 64/00; H04W 4/025; G01S 5/02; G01S 19/14; G01S 19/39
See application file for complete search history.

(56) References Cited

U.S. PATENT DOCUMENTS 9,076,009 B2 7/2015 Sathish et al.
2006/0136173 A1* 6/2006 Case ...................... A63B 24/00
702/182

(Continued)

FOREIGN PATENT DOCUMENTS

CN 101146262 A 3/2008
CN 102075850 A 5/2011
(Continued)

Primary Examiner — Marcos Torres
(74) Attorney, Agent, or Firm — Muncy, Geissler, Olds & Lowe, PC

(57) ABSTRACT

A method for determining user activity range includes: determining a moving state of a user; determining, when the moving state of the user is a first state, geographical location information of the user corresponding to the first state; determining, when the moving state of the user is a second state, a geographical location information set of the user corresponding to the second state; and collecting, in a first predetermined time period, geographical location information of the user corresponding to at least one first state, and a geographical location information set of the user corresponding to at least one second state, and combining the geographical location information of the user determined in the first state in the first predetermined time period with the geographical location information set of the user determined in the second state in the first predetermined time period, so as to determine a user activity range.

14 Claims, 8 Drawing Sheets

(51) Int. Cl.
*G01S 19/14* (2010.01)
*G01S 19/39* (2010.01)
*G01S 5/02* (2010.01)

(52) U.S. Cl.
CPC ............ H04W 4/02 (2013.01); H04W 64/00 (2013.01); *H04W 4/025* (2013.01)

(56) References Cited

U.S. PATENT DOCUMENTS

2012/0290217 A1* 11/2012 Shoval ................ G06F 19/3418
702/19
2014/0218369 A1* 8/2014 Yuen .................... A61B 5/6838
345/440

FOREIGN PATENT DOCUMENTS

JP  2009043057 A  2/2009
WO  2012019365 A1  2/2012

\* cited by examiner

METHOD, APPARATUS, AND TERMINAL DEVICE FOR DETERMINING USER ACTIVITY RANGE

CROSS REFERENCE TO RELATED APPLICATION

This application is a continuation of International Application No. PCT/CN2015/071232, filed on Jan. 21, 2015, which claims priority to Chinese patent application No. 201410030799.9, filed on Jan. 23, 2014, the content of which are incorporated herein by reference in their entirety.

FIELD OF THE TECHNOLOGY

The present disclosure relates to the field of geographical positioning technologies, and in particular, to a method, an apparatus, and a terminal device for determining user activity range.

BACKGROUND OF THE DISCLOSURE

A user activity range refers to a geographical location range corresponding to activities implemented by a user. That is, the geographical location range is constituted by each and every location at which the respective user activity is implemented. To accurately determine a user activity range is of great significance to accurate information recommendation. For example, after a user activity range is determined, news of happenings in the user activity range may be recommended to a user, so that the user can learn in time the happenings in the user activity range, thereby making information recommendations to a more accurate target population, which therefore is of great significance to researches on the accuracy of determining user activity range.

Currently, a manner of determining user activity range is that: A user marks, according to living habits, frequented places, and activity routes of the user, frequented places and activity routes of the user on a map of a city where activities of the user take place, and draws a user activity range on the map in a manual manner. Some information recommendations are made based on the activity range drawn by the user.

During the research and practice of the present disclosure, the inventor finds that the prior art at least has the following technical problems: The existing manner of drawing a user activity range on a map according to living habits, frequented places, and activity routes of a user is to draw a user activity range by using subjective factors of a user, and a user cannot accurately determine specific geographical locations in an activity range; as a result, a drawn user activity range is inaccurate, thereby affecting the accuracy of information recommendation.

SUMMARY

An exemplary method for determining user activity range includes:

determining a moving state of a user, where the moving state includes a first state and a second state, where an average moving speed of the user in the second state is greater than an average moving speed of the user in the first state;

determining, when the moving state of the user is the first state, geographical location information of the user corresponding to the first state;

determining, when the moving state of the user is the second state, a geographical location information set of the user corresponding to the second state, where the geographical location information set is formed by multiple pieces of geographical location information of the user that are determined according to a time sequence during the second state; and collecting, in a first predetermined time period, geographical location information of the user corresponding to at least one first state, and a geographical location information set of the user corresponding to at least one second state, and combining the geographical location information of the user determined in the first state in the first predetermined time period with the geographical location information set of the user determined in the second state in the first predetermined time period, so as to determine a user activity range.

An embodiment of the present disclosure further provides an apparatus for determining user activity range, including:

a moving state determining module, configured to determine a moving state of a user, where the moving state includes a first state and a second state, where an average moving speed of the user in the second state is greater than an average moving speed of the user in the first state;

a first determining module, configured to determine, when the moving state of the user is the first state, geographical location information of the user corresponding to the first state;

a second determining module, configured to determine, when the moving state of the user is the second state, a geographical location information set of the user corresponding to the second state, where the geographical location information set is formed by multiple pieces of geographical location information of the user that are determined according to a time sequence during the second state;

a collection module, configured to collect, in a first predetermined time period, geographical location information of the user corresponding to at least one first state, and a geographical location information set of the user corresponding to at least one second state; and an activity range determining module, configured to combine the geographical location information of the user determined in the first state in the first predetermined time period with the geographical location information set of the user determined in the second state in the first predetermined time period, so as to determine a user activity range.

An embodiment of the present disclosure further provides a terminal device, including the foregoing apparatus for determining user activity range.

Based on the foregoing technical solutions, in the method for determining user activity range provided in the embodiments of the present disclosure, when a moving state of a user is a first state, geographical location information of the user corresponding to the first state is determined, and a geographical location determined in the first state corresponds to geographical location information of the user when the user lingers in one place; when the moving state of the user is a second state, a geographical location information set of the user corresponding to the second state is determined, where the geographical location information set is formed by multiple pieces of geographical location information of the user that are determined according to a time sequence during the second state, that is, during the second state, geographical location information of the user is determined multiple times, and a set of the multiple pieces of geographical location information that are determined according to the time sequence corresponds to a moving route of the user when the user is in a traffic state; and in a first predetermined time period, geographical location information of the user corresponding to at least one first state, and a geographical location information set of the user corresponding to at least one second state are collected, and the collected geographical location information of the user in the first state is combined with the collected geographical location information set of the user in the second state, so that a geographical location parameter that reflects a user activity range can be formed, thereby determining the user activity range. In the method for determining user activity range provided in the embodiments of the present disclosure, the moving state of the user is differentiated between the first state and the second state, the geographical location information is determined in the first state, and the geographical location information set that represents the moving route is determined in the second state, so that the user activity range can be automatically determined in a moving process of the user, and a specific geographical location in the user activity range can be accurately determined by using a positioning technology, thereby automatically and accurately determining the user activity range.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Obviously, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Obviously, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
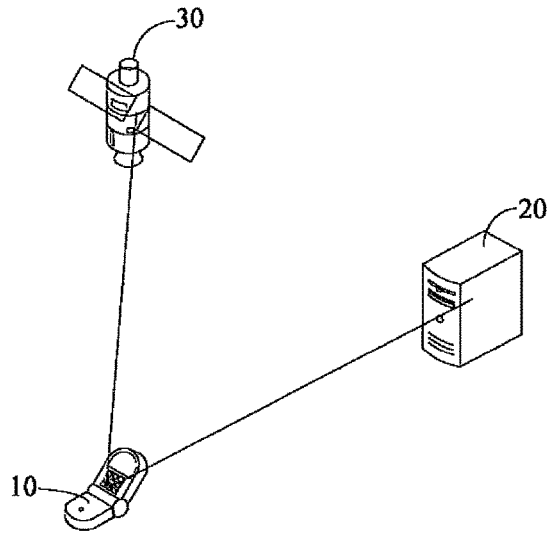
FIG. 1 is a structural block diagram of an application system to which a method for determining user activity range according to an embodiment of the present disclosure is applied.

Referring to FIG. 1, FIG. 1 is a structural block diagram of an application system to which a method for determining user activity range according to an embodiment of the present disclosure is applied. The system includes: a terminal device 10, a server 20, and a satellite 30.

The terminal device 10 may be a mobile device such as a smartphone or a tablet computer. In the embodiment of the present disclosure, the terminal device 10 can detect a moving state of a user (for example, detect the moving state by using an apparatus, for example, an acceleration sensor, built in the terminal device 10), where the moving state of the user includes a first state and a second state, where an average moving speed of the user in the second state is greater than an average moving speed of the user in the first state; when detecting that the moving state of the user is the first state, the terminal device 10 can determine geographical location information of the user corresponding to the first state; when the moving state of the user is the second state, the terminal device 10 determines a geographical location information set of the user corresponding to the second state, where the geographical location information set is formed by multiple pieces of geographical location information of the user that are determined according to a time sequence during the second state; and in a first predetermined time period, the terminal device 10 collects geographical location information of the user corresponding to at least one first state, and a geographical location information set of the user corresponding to at least one second state, and after the first predetermined time period ends, the terminal device 10 combines the geographical location information of the user determined in the first state in the first predetermined time period with the geographical location information set of the user determined in the second state in the first predetermined time period, so as to determine a user activity range.

Optionally, the terminal device 10 may exchange information with the satellite 30, and geographical location information of a user is determined by using a satellite positioning technology. Obviously, this patent may also determine the geographical location information of the user by using, instead of a satellite positioning technology, another positioning technology such as a base station positioning technology. The satellite in the figure may be replaced by another device that can exchange data with the terminal device 10 and has a geographical positioning function.

After the terminal device 10 determines the user activity range, the terminal device 10 uploads, to the server 20, data (mainly geographical location information of the user determined in the first state, and a geographical location information set of the user determined in the second state) corresponding to the user activity range.

The server 20 may be one server or one set of servers running independently, and a correspondence between geographical location information and recommendation information (for example, a correspondence between geographical location information of a shop and commodity information of the shop) is preset in the server 20. After receiving the data corresponding to the user activity range, the server 20 may recommend, to the terminal device 10, recommendation information that corresponds to the data corresponding to the user activity range, thereby accurately recommending information to the terminal device 10. The recommendation information may be commodity recommendation information, or may be news recommendation information.

Figure 2:
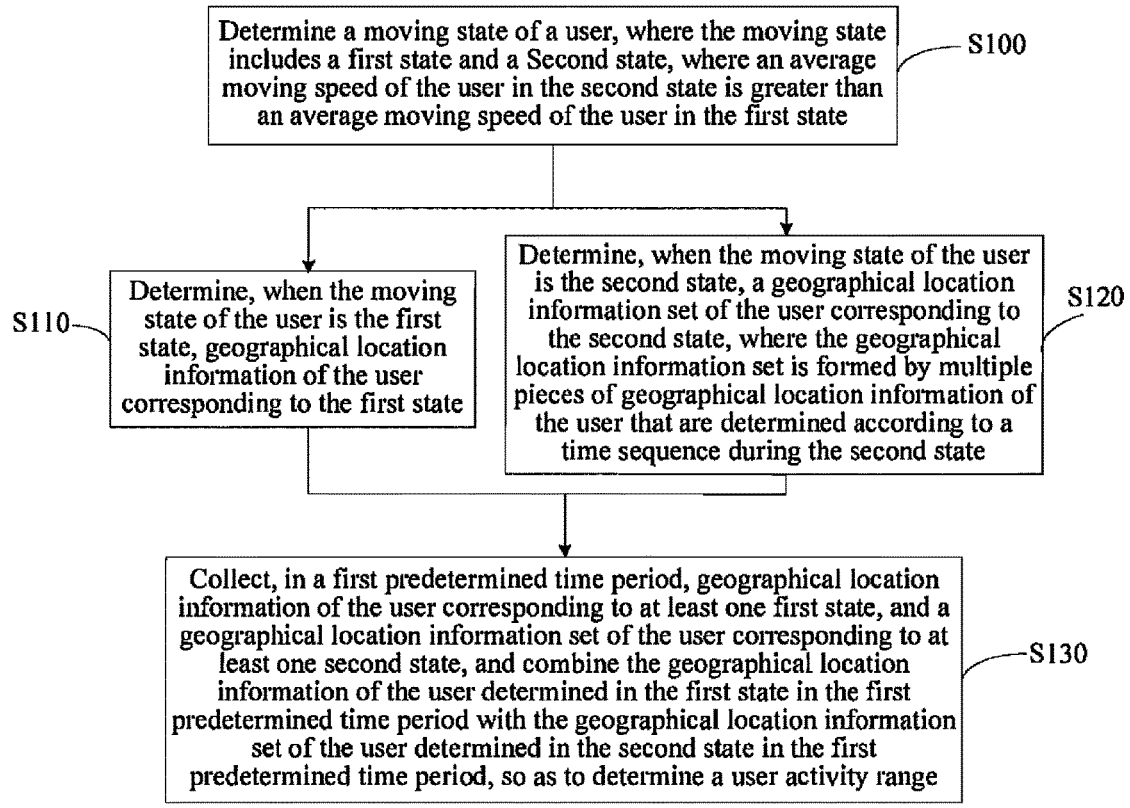
FIG. 2 is a flowchart of a method for determining user activity range according to an embodiment of the present disclosure.

With reference to the foregoing description, a method for determining user activity range according to an embodiment of the present disclosure is described below in terms of a terminal device. FIG. 2 is a flowchart of a method for determining user activity range according to an embodiment of the present disclosure. The method may be applied to a terminal device, and the terminal device may be a device such as a smartphone or a tablet computer. Referring to FIG. 2, the method may include:

Step S100: Determine a moving state of a user, where the moving state includes a first state and a second state, where an average moving speed of the user in the second state is greater than an average moving speed of the user in the first state.

The first state and the second state may be two different activity states of a user, and both the first state and the second state have a period of duration time. Optionally, the first state may be a still state, where the still state indicates a state in which the user stays at a geographical location within a period of time, for example, the user stays at home or in a workplace; and the second state may be a traffic state, where the traffic state indicates a state in which a geographical location of the user dynamically changes within a period of time, for example, the user walks, rides, or drives.

The average moving speeds of the user are different during the first state and during the second state. When in the first state, the user stays at a geographical location within a period of time, and therefore, during the first state, the average moving speed of the user is relatively low; while in the second state, a geographical location of the user within a period of time changes dynamically, and therefore, during the second state, the average moving speed of the user is relatively high; and the average moving speed of the user in the second state is greater than the average moving speed of the user in the first state.

Step S110: Determine, when the moving state of the user is the first state, geographical location information of the user corresponding to the first state.

The moving state of the user being the first state indicates that the user stays at a geographical location during the first state, and therefore, during the first state, the geographical location information of the user may be determined only once. Certainly, the geographical location information may be determined multiple times, but because the user stays at a geographical location during the first state, a result of determining the geographical location information once is nearly the same as that of determining the geographical location information multiple times.

Optionally, in the embodiment of the present disclosure, the geographical location information may be determined by using a technology, such as a satellite positioning (for example, the Global Positioning System GPS) technology, or a base station positioning technology, that has a geographical positioning function.

Step S120: Determine, when the moving state of the user is the second state, a geographical location information set of the user corresponding to the second state, where the geographical location information set is formed by multiple pieces of geographical location information of the user that are determined according to a time sequence during the second state.

The moving state of the user being the second state indicates that the geographical location of the user dynamically changes during the second state, and the geographical location that dynamically changes reflects a moving route of the user. During the second state, in the embodiment of the present disclosure, the geographical location information of the user needs to be determined multiple times, and preferably, in real time; and geographical location information that is determined multiple times during the second state is aggregated according to a time sequence into a geographical location information set, and then the set reflects a moving route of the user during the second state.

Step S130: Collect, in a first predetermined time period, geographical location information of the user corresponding to at least one first state, and a geographical location information set of the user corresponding to at least one second state, and combine the geographical location information of the user determined in the first state in the first predetermined time period with the geographical location information set of the user determined in the second state in the first predetermined time period, so as to determine a user activity range.

The first predetermined time period may be one day, or may be manually set by the user according to a life style of the user, and the embodiment of the present disclosure does not limit a specific setting of the first predetermined time period. There are multiple first states and second states in the first predetermined time period, that is, in the first predetermined time period, the user may lingers in one place in multiple time periods, or may be in a traffic state such as walking or riding in multiple time periods. The determined geographical location information of the user corresponding to first state is combined with the geographical location information set of the user determined in the second state in the first predetermined time period, and then multiple geographical location parameters that reflect that the user lingers in a place and the user is in the traffic state are formed. These parameters are geographical location parameters corresponding to the user activity range.

In the method for determining user activity range provided in the embodiment of the present disclosure, when a moving state of a user is a first state, geographical location information of the user corresponding to the first state is determined, and a geographical location determined in the first state corresponds to geographical location information of the user when the user lingers in one place; when the moving state of the user is a second state, a geographical location information set of the user corresponding to the second state is determined, where the geographical location information set is formed by multiple pieces of geographical location information of the user that are determined according to a time sequence during the second state, that is, during the second state, geographical location information of the user is determined multiple times, and a set of the multiple pieces of geographical location information that are determined according to the time sequence corresponds to a moving route of the user when the user is in a traffic state; and in a first predetermined time period, geographical location information of the user corresponding to at least one first state, and a geographical location information set of the user corresponding to at least one second state are collected, and the collected geographical location information of the user in the first state is combined with the collected geographical location information set of the user in the second state, so that a geographical location parameter that reflects a user activity range can be formed, thereby determining the user activity range. In the method for determining user activity range provided in the embodiment of the present disclosure, the moving state of the user is differentiated between the first state and the second state, the geographical location information is determined in the first state, and the geographical location information set that represents the moving route is determined in the second state, so that the user activity range can be automatically determined in a moving process of the user, and a specific geographical location in the user activity range can be accurately determined by using a positioning technology, thereby automatically and accurately determining the user activity range.

Figure 3:
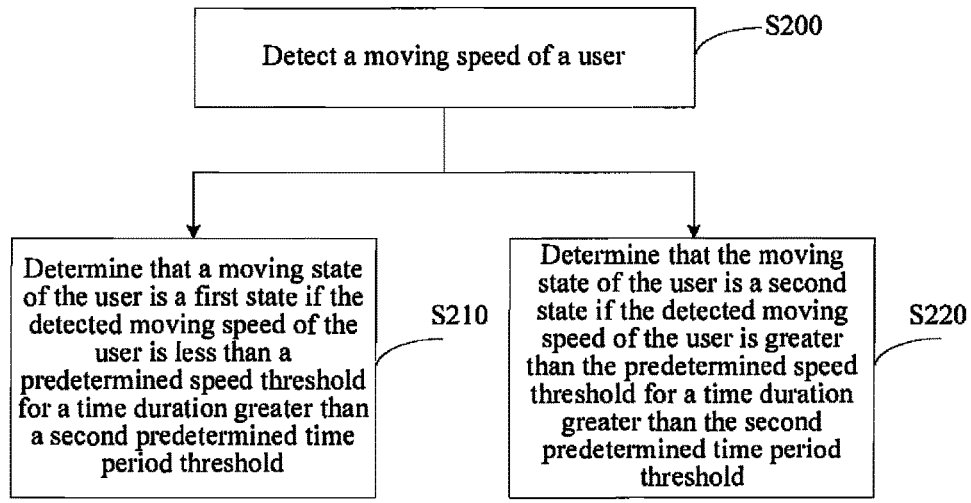
FIG. 3 is a flowchart of a method for determining a moving state of a user according to an embodiment of the present disclosure.

Optionally, in the embodiment of the present disclosure, a moving state of a user can be determined by detecting a moving speed of the user. Correspondingly, FIG. 3 shows a procedure of a method for determining a moving state of a user according to an embodiment of the present disclosure. Referring to FIG. 3, the method may include:

Step S200: Detect a moving speed of a user.

Optionally, the moving speed of the user may be detected by using a speed sensor. Obviously, a moving distance of the user within a set period of time may also be detected, and the moving speed of the user is calculated by using the moving distance and the set period of time. There are multiple manners of detecting a moving speed of a user, and the embodiment of the present disclosure does not limit a specific detection means.

Step S210: Determine that a moving state of the user is a first state if the detected moving speed of the user is less than a predetermined speed threshold for a time duration greater than a second predetermined time period threshold.

If within a period of time greater than the second predetermined time period threshold, the moving speed of the user is always less than the predetermined speed threshold, it may be determined that the moving state of the user is the first state, and the user lingers in a place within a period of time. Optionally, the predetermined speed threshold may be a threshold value of a traffic speed (walking, riding, by motor vehicles, or the like) and a lingering speed of the user, and the second predetermined time period threshold may be manually set according to an actual application condition, which are not limited in the embodiment of the present disclosure.

Step S220: Determine that the moving state of the user is a second state if the detected moving speed of the user is greater than the predetermined speed threshold for a time duration greater than the second predetermined time period threshold.

The method shown in FIG. 3 is an optional manner of determining the first state and the second state by using the average moving speed of the user. In the embodiment of the present disclosure, the average moving speed of the user may further be determined in another manner, thereby further determining the first state and the second state by using the average moving speed of the user.

Optionally, the first state and the second state may further be determined through triggering by the user. If the user is in the first state, for example, the user lingers in a place, the user can click a setting button disposed on an electronic device (for example, a terminal device), so that the electronic device determines that a current moving state of the user is the first state. Obviously, when the user is in the second state, for example, when the user walks, the user can click another setting button disposed on the electronic device, so that the electronic device determines that the current moving state of the user is the second state.

Optionally, after it is determined that the moving state of the user is the second state, geographical location information of the user may be determined once in each third predetermined time period during the second state, until the moving state of the user changes into the first state; and multiple pieces of geographical location information that are determined according to a time sequence during the second state are aggregated to form the geographical location information set. Optionally, the third predetermined time period may be set to be short enough, so as to achieve near real-time geographical positioning. Optionally, geographical locations corresponding to the geographical location information in the geographical location information set may be marked on a map, and the corresponding geographical locations marked on the map may be connected according to the time sequence in which the geographical location information in the geographical location information set is determined, so as to draw a moving route of the user. An optional manner of drawing a moving route may be that: during the second state, geographical locations corresponding to the geographical location information that is determined in each third predetermined time period are marked on the map, and the corresponding geographical locations marked on the map are connected according to a time sequence in which the geographical location information is determined, so as to draw a moving route.

Optionally, the map involved in the embodiment of the present disclosure may be a map with geographical location information, for example, a map with latitude and longitude information, and each location point on the map corresponds to a latitude and longitude. In the this embodiment of the present disclosure, a manner of marking, on a map, geographical locations corresponding to the determined geographical location information of the user may be: searching a map by using the determined geographical location information for a location point corresponding to the determined geographical location information, and marking the location point.

Optionally, in the embodiment of the present disclosure, after the geographical location information of the user corresponding to the first state is determined, a geographical location corresponding to the geographical location information of the user corresponding to the first state may also be marked on the map; and after the geographical locations corresponding to the geographical location information of the user corresponding to the first state are marked on the map, and the moving route corresponding to the second state is drawn, the geographical location of the user corresponding to the first state that is marked on the map in a first predetermined time period may be combined with the moving route drawn on the map, so as to draw a user activity range area chart.

Figure 4:
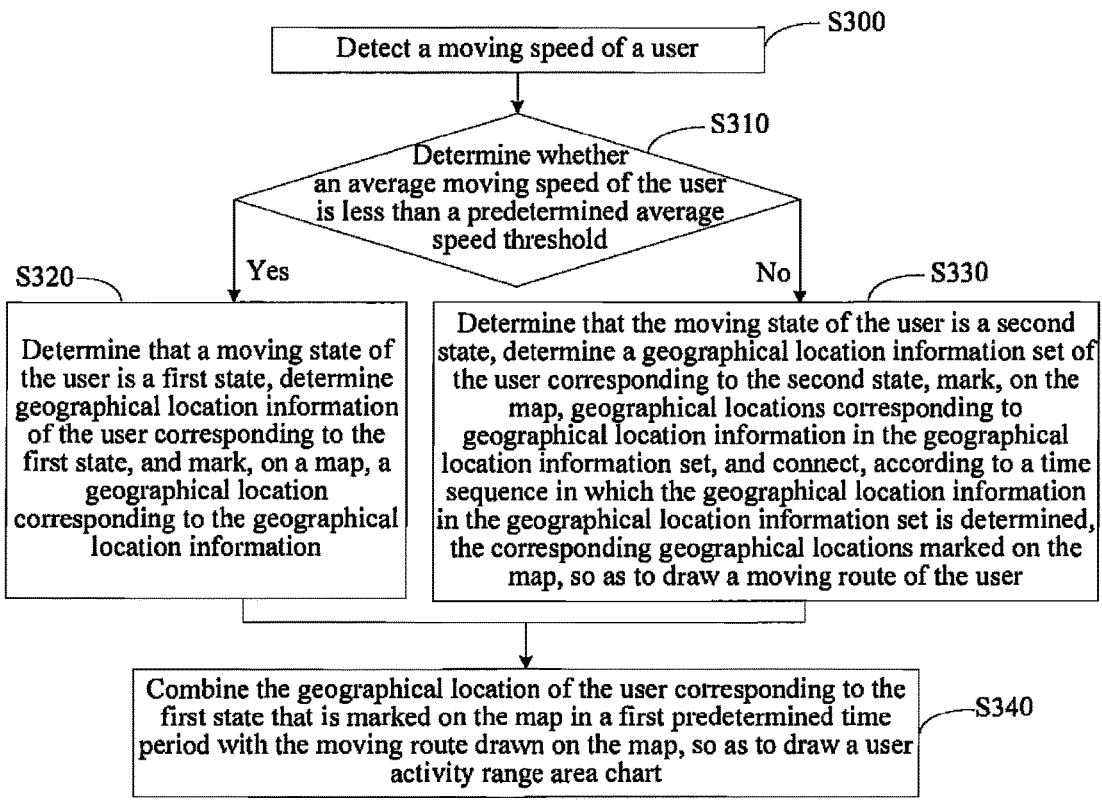
FIG. 4 is another flowchart of a method for determining user activity range according to an embodiment of the present disclosure.

A preferred method for determining user activity range provided in the embodiment of the present disclosure is described below. Notably, the method for determining user activity range described below is only a preferred manner, which should not limit the protection scope of the embodiment of the present disclosure. FIG. 4 is another flowchart of a method for determining user activity range according to an embodiment of the present disclosure. Referring to FIG. 4, the method may include:

Step S300: Detect a moving speed of a user.

Step S310: Determine whether an average moving speed of the user is less than a predetermined average speed threshold, and if yes, perform step S320, or if not, perform step S330.

The average moving speed of the user being less than the predetermined average speed threshold may be that the moving speed of the user is less than a predetermined speed threshold, and a duration time is greater than a second predetermined time period threshold; and the average moving speed of the user being greater than the predetermined average speed threshold may be that the moving speed of the user is greater than the predetermined speed threshold, and the duration time is greater than the second predetermined time period threshold.

Step S320: Determine that a moving state of the user is a first state, determine geographical location information of the user corresponding to the first state, and mark, on a map, a geographical location corresponding to the geographical location information.

Step S330: Determine that the moving state of the user is a second state, determine a geographical location information set of the user corresponding to the second state, mark, on the map, geographical locations corresponding to geographical location information in the geographical location information set, and connect, according to a time sequence in which the geographical location information in the geographical location information set is determined, the corresponding geographical locations marked on the map, so as to draw a moving route of the user.

Optionally, in the embodiment of the present disclosure, geographical location information may be determined once in each third predetermined time period, thereby forming a geographical location information set.

Step S340: Combine the geographical location of the user corresponding to the first state that is marked on the map in a first predetermined time period with the moving route drawn on the map, so as to draw a user activity range area chart.

The user activity range area chart is the presentation of a user activity range on the map, and in the embodiment of the present disclosure, each geographical location and moving route in the user activity range area chart may be precise to a latitude and longitude level.

Figure 5:
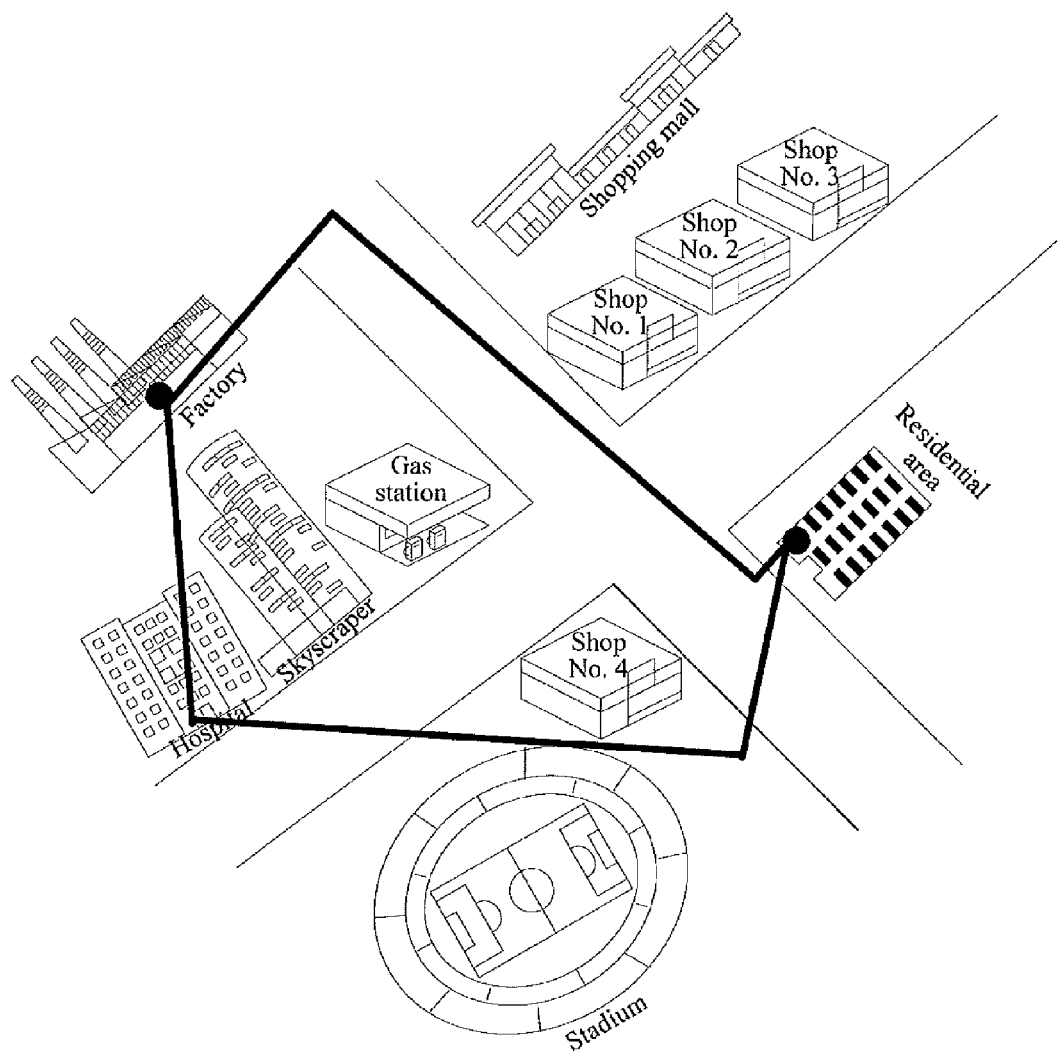
FIG. 5 is a schematic diagram of a user activity range area chart according to an embodiment of the present disclosure.

With reference to a user activity range area chart shown in FIG. 5, a geographical location corresponding to a first state may be marked (obviously, the geographical location may further be marked by using another dotted picture) on a map by using a black dot, so as to show that the user lingers in the area of the dot, and on the map, the black dot may further correspond to specific latitude and longitude information; and a moving route corresponding to a second state may be marked by using a black thick line, so as to show that the user moves along the line, and location points on the line may further correspond to specific latitude and longitude information. An area formed by black dots and black thick lines on a map is a user activity range area chart.

Figure 6:
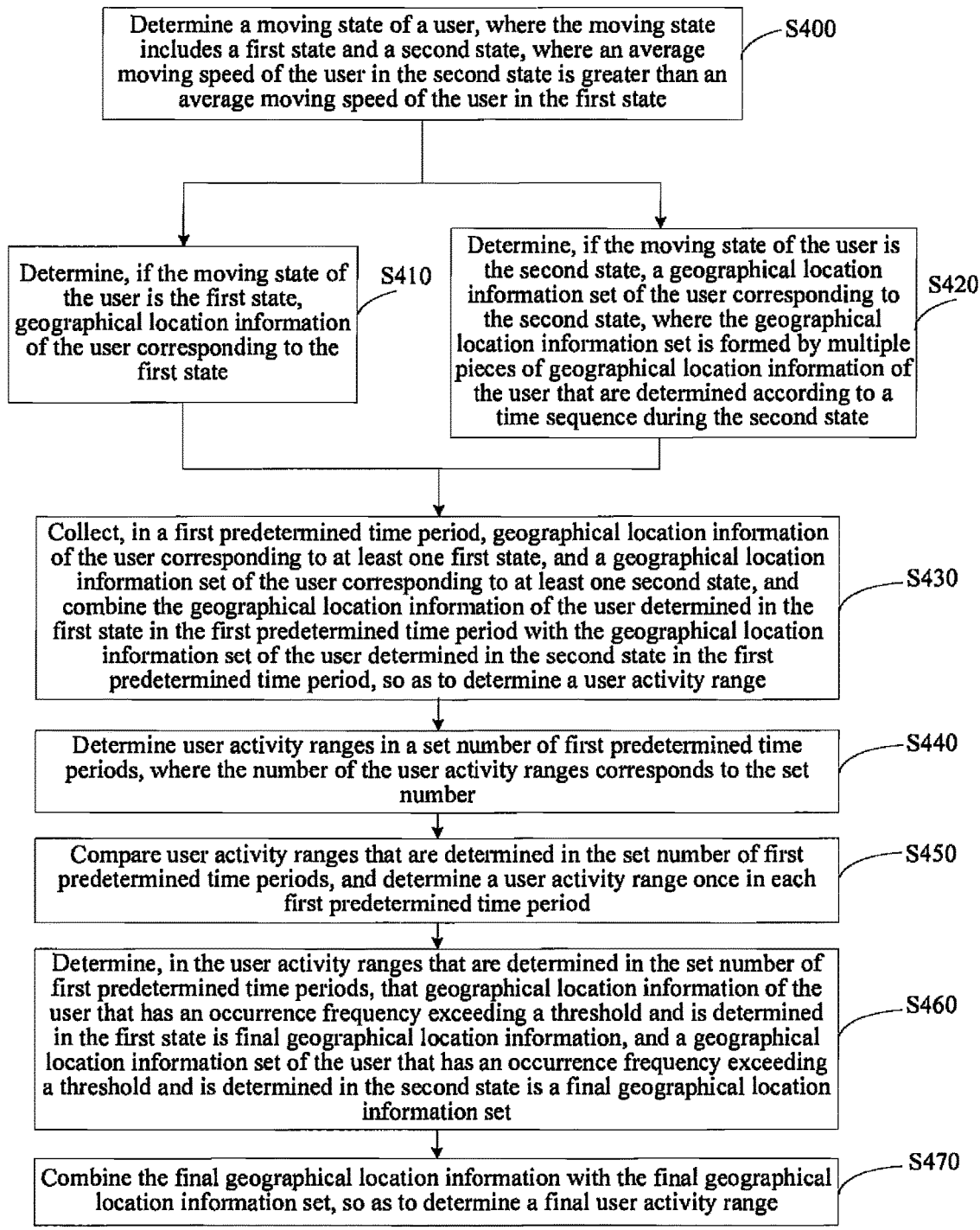
FIG. 6 is still another flowchart of a method for determining user activity range according to an embodiment of the present disclosure.

Optionally, in order to further ensure precision of determining user activity range, in the embodiment of the present disclosure, in a set number of first predetermined time periods, user activity ranges whose number correspond to the set number may be determined, and the determined user activity ranges whose number corresponds to the set number are compared, and geographical location information of the user corresponding to a first state and a geographical location information set corresponding to a second state are filtered in the user activity range, so as to obtain a user activity range having higher precision. Correspondingly, FIG. 6 is still another flowchart of a method for determining user activity range according to an embodiment of the present disclosure. Referring to FIG. 6, the method may include:

Step S400: Determine a moving state of a user, where the moving state includes a first state and a second state, where an average moving speed of the user in the second state is greater than an average moving speed of the user in the first state.

Step S410: Determine, when the moving state of the user is the first state, geographical location information of the user corresponding to the first state.

Optionally, a geographical location corresponding to the determined geographical location information corresponding to the first state may be marked on a map.

Step S420: Determine, if the moving state of the user is the second state, a geographical location information set of the user corresponding to the second state, where the geographical location information set is formed by multiple pieces of geographical location information of the user that are determined according to a time sequence during the second state.

Optionally, geographical locations corresponding to multiple pieces of geographical location information in the geographical location information set may be marked on a map, and the geographical locations marked on the map are connected according to a time sequence in which the geographical location information is determined, so as to draw a moving route.

Step S430: Collect, in a first predetermined time period, geographical location information of the user corresponding to at least one first state, and a geographical location information set of the user corresponding to at least one second state, and combine the geographical location information of the user determined in the first state in the first predetermined time period with the geographical location information set of the user determined in the second state in the first predetermined time period, so as to determine a user activity range.

Optionally, the geographical location corresponding to the first state that is marked on the map may be combined with the moving route drawn in the second state, so as to determine a user activity range area chart, and further determine a user activity range.

Step S440: Determine, in a set number of first predetermined time periods, user activity ranges whose number corresponds to the set number.

Step S450: Compare user activity ranges that are determined in the set number of first predetermined time periods, and determine a user activity range once in each first predetermined time period.

Optionally, user activity range area charts corresponding to user activity ranges that are determined in the set number of first predetermined time periods and whose number corresponds to the set number are superimposed on the map. Optionally, a superimpose manner may be: superimposing together all user activity range area charts corresponding to the user activity ranges whose number corresponds to the set number; or superimposing every two user activity range area charts, that is, superimposing a user activity range area chart determined the first time on a user activity range area chart determined the second time, and then superimposing a user activity range area chart determined the third time on a user activity range area chart that is obtained by superimposing the first-time determined area chart on the second-time determined area chart, and the like, until all user activity range area charts have been superimposed.

Step S460: Determine, in the user activity ranges that are determined in the set number of first predetermined time periods, that geographical location information of the user that has an occurrence frequency exceeding a threshold and is determined in the first state is final geographical location information, and a geographical location information set of the user that has an occurrence frequency exceeding a threshold and is determined in the second state is a final geographical location information set.

Optionally, being reflected on the superimposed user activity range area chart, the occurrence frequency may be the number of times that geographical locations overlap. In the embodiment of the present disclosure, after the user activity range area charts corresponding to the user activity ranges whose number corresponds to the set number are superimposed, it may be determined that a superimposed geographical location that has a number of overlapping times exceeding a threshold is a final geographical location, and that a superimposed moving route that has a number of overlapping times exceeding a threshold is a final moving route.

Step S470: Combine the final geographical location information with the final geographical location information set, so as to determine a final user activity range.

Optionally, a geographical location that has a number of overlapping times exceeding a threshold may be combined with a moving route that has a number of overlapping times exceeding a threshold on the map, so as to form a final user activity range area chart.

Optionally, after the final user activity range area chart is determined, the user activity range area chart may be enlarged according to a set range, and the enlarged user activity range area chart may be used as a main user activity range.

Figure 7:
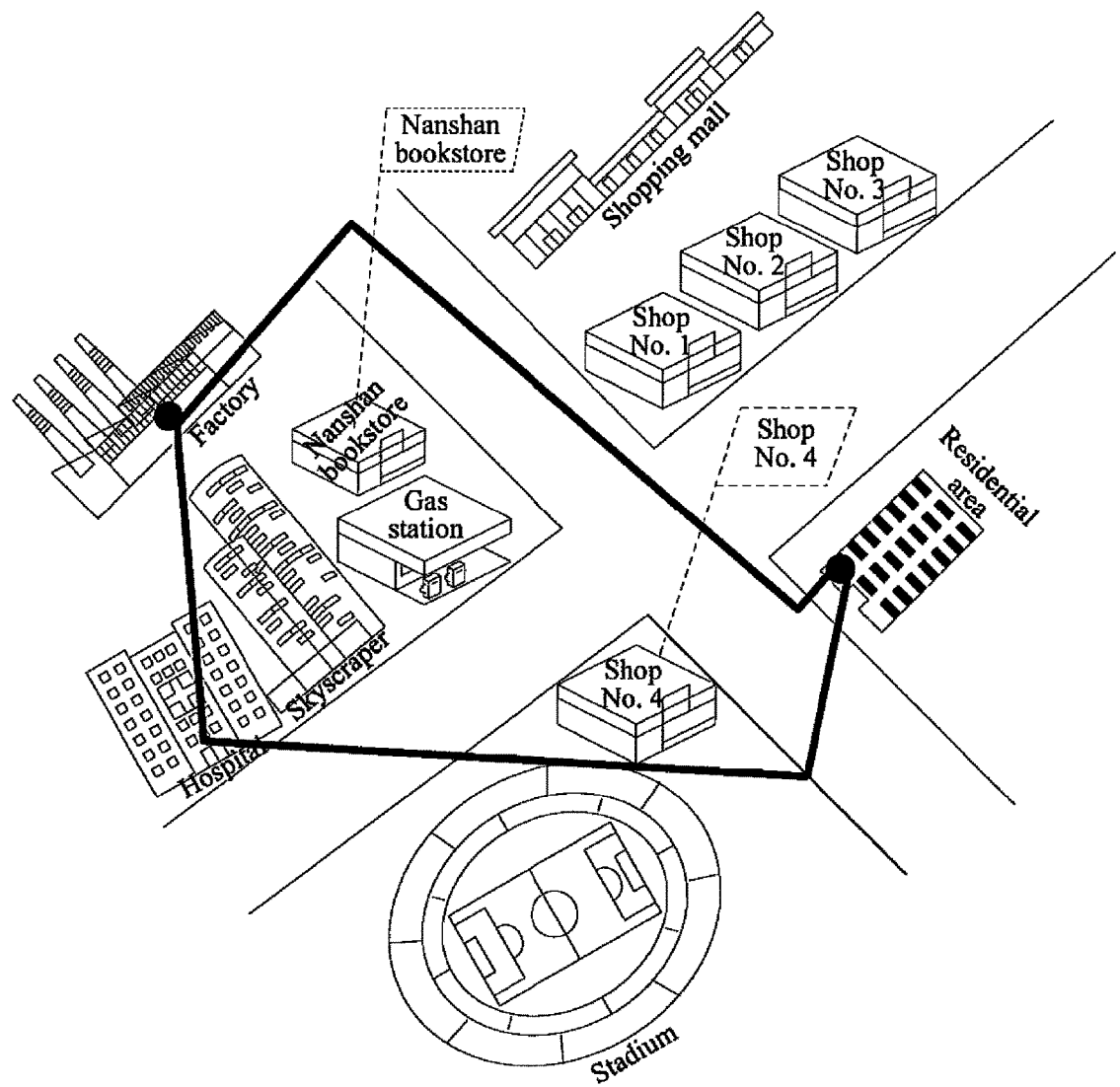
FIG. 7 is a schematic diagram of a user activity range area chart and corresponding information according to an embodiment of the present disclosure.

FIG. 7 is a schematic diagram of a user activity range area chart and corresponding information. After a user activity range is determined, a terminal device may send, to a server, data corresponding to the user activity range, where the data is mainly geographical location information of a user determined in a first state in a first predetermined time period, and a geographical location information set of the user determined in a second state in the first predetermined time period. After receiving the data corresponding to the user activity range, the server may recommend recommendation information that corresponds to the data corresponding to the user activity range, so that the user can learn in time information in the user activity range. Specifically, in the embodiment of the present disclosure, the server may establish in advance a correspondence between the recommendation information and the geographical location information. After receiving the data corresponding to the user activity range, the server may compare the data corresponding to the user activity range with geographical location information established in advance, and if the geographical location information established in advance is in the data corresponding to the determined user activity range, corresponding recommendation information may be recommended to the user. As shown in FIG. 7, there are shops such as a Nanshan bookstore and a shop No. 4 in the user activity range. Geographical location information and shop information (for example, a shop introduction, or commodity information) of these shops may be prestored in the server, and after receiving the data corresponding to the user activity range, the server may recommend the shop information in the user activity range to the user. Obviously, the server may also recommend, to the user, information such as news of happenings in the user activity range.

Preferably, one city may correspond to one user activity range, and when the user moves from a first city to a second city, a user activity range corresponding to the second city may be redetermined, so as to recommend, to the user after the user activity range corresponding to the second city is determined, information corresponding to the second city. Specifically, in the embodiment of the present disclosure, it can be determined by using a positioning technology such as a satellite positioning technology or a base station positioning technology that the user moves from the first city to the second city, so as to stop determining the user activity range in the first city and start to determine the user activity range in the second city.

In the embodiment of the present disclosure, a user activity range can be automatically determined in a moving process of the user, and a specific geographical location in the user activity range can be accurately determined by using a positioning technology, thereby automatically and accurately determining the user activity range.

An apparatus for determining user activity range provided in the embodiment of the present disclosure is described below. For the apparatus for determining user activity range described below and the method for determining user activity range described above, mutual reference may be made correspondingly.

Figure 8:
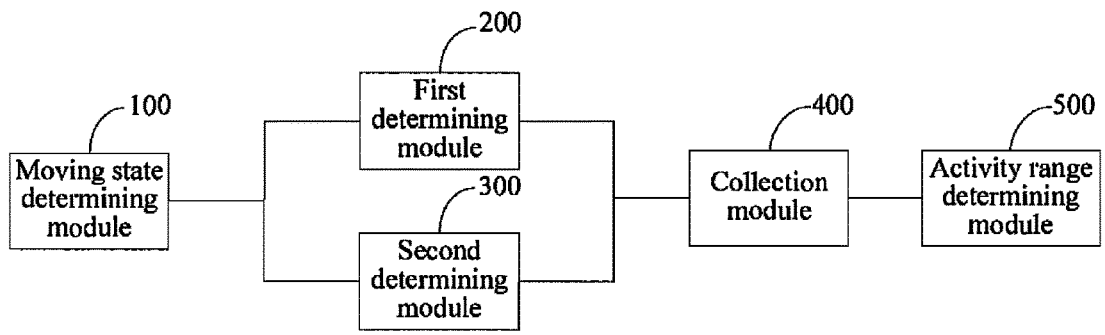
FIG. 8 is a structural block diagram of an apparatus for determining user activity range according to an embodiment of the present disclosure.

FIG. 8 is a structural block diagram of an apparatus for determining user activity range according to an embodiment of the present disclosure. The apparatus may be applied to a terminal device, and the terminal device may be a device such as a smartphone or a tablet computer. Referring to FIG. 8, the apparatus may include:

a moving state determining module 100, configured to determine a moving state of a user, where the moving state includes a first state and a second state, where an average moving speed of the user in the second state is greater than an average moving speed of the user in the first state;

a first determining module 200, configured to determine, when the moving state of the user is the first state, geographical location information of the user corresponding to the first state;

a second determining module 300, configured to determine, when the moving state of the user is the second state, a geographical location information set of the user corresponding to the second state, where the geographical location information set is formed by multiple pieces of geographical location information of the user that are determined according to a time sequence during the second state;

a collection module 400, configured to collect, in a first predetermined time period, geographical location information of the user corresponding to at least one first state, and a geographical location information set of the user corresponding to at least one second state; and an activity range determining module 500, configured to combine the geographical location information of the user determined in the first state in the first predetermined time period with the geographical location information set of the user determined in the second state in the first predetermined time period, so as to determine a user activity range.

Figure 9:
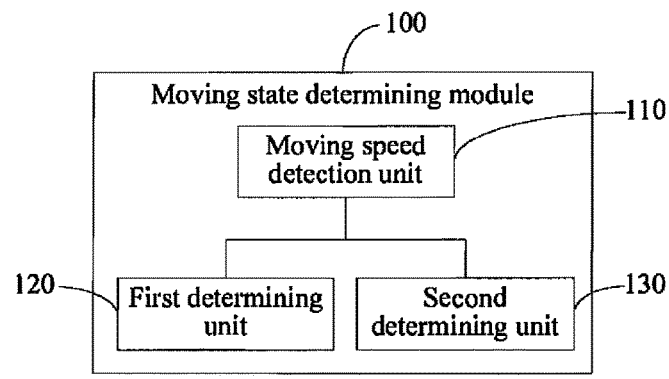
FIG. 9 is a structural block diagram of a moving state determining module according to an embodiment of the present disclosure.

Optionally, FIG. 9 shows an optional structure of a moving state determining module 100. Referring to FIG. 9, the moving state determining module 100 may include:

a moving speed detection unit 110, configured to detect a moving speed of a user;

a first determining unit 120, configured to determine that the moving state of the user is the first state if the detected moving speed of the user is less than a predetermined speed threshold for a time duration greater than a second predetermined time period threshold; and a second determining unit 130, configured to determine that the moving state of the user is the second state if the detected moving speed of the user is greater than the predetermined speed threshold for a time duration greater than the second predetermined time period threshold.

Figure 10:
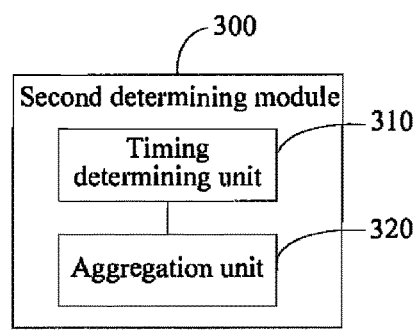
FIG. 10 is a structural block diagram of a second determining module according to an embodiment of the present disclosure.

Optionally, FIG. 10 shows an optional structure of a second determining module 300. Referring to FIG. 10, the second determining module 300 may include:

a timing determining unit 310, configured to determine, during the second state, geographical location information of the user once in each third predetermined time period, until the moving state of the user changes into the first state; and an aggregation unit 320, configured to aggregate the multiple pieces of geographical location information that are determined according to the time sequence during the second state, so as to form the geographical location information set.

Figure 11:
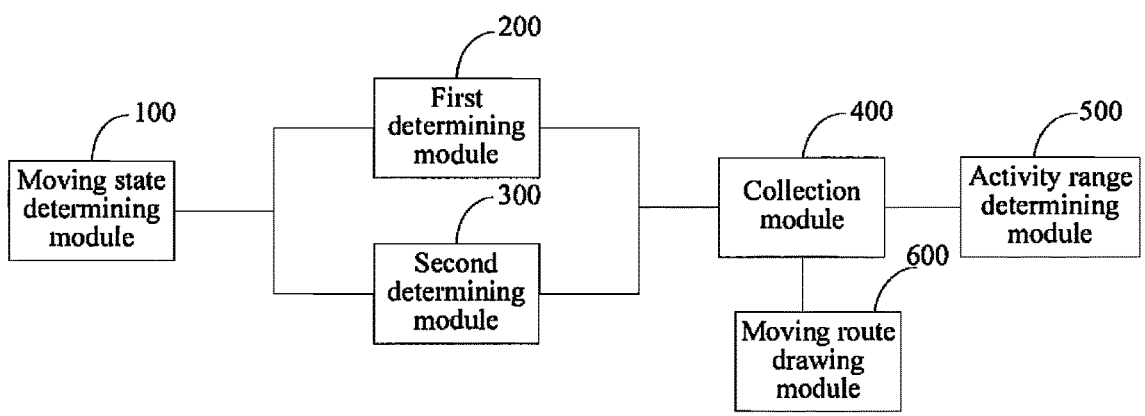
FIG. 11 is another structural block diagram of an apparatus for determining user activity range according to an embodiment of the present disclosure.

Optionally, FIG. 11 shows another structure of an apparatus for determining user activity range according to an embodiment of the present disclosure. With reference to FIG. 8 and FIG. 11, the apparatus for determining user activity range may further include:

a moving route drawing module 600, configured to mark, on a map, geographical locations corresponding to the geographical location information in the geographical location information set, and connect, according to the time sequence in which the geographical location information in the geographical location information set is determined, the corresponding geographical locations marked on the map, so as to draw a moving route of the user.

Figure 12:
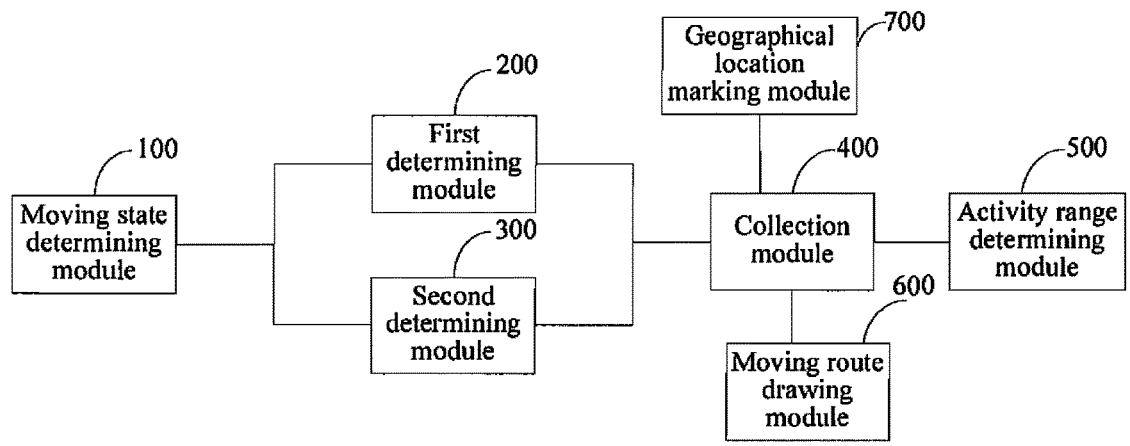
FIG. 12 is still another structural block diagram of an apparatus for determining user activity range according to an embodiment of the present disclosure.

Correspondingly, based on the apparatus for determining user activity range shown in FIG. 11, FIG. 12 shows still another structure of an apparatus for determining user activity range according to an embodiment of the present disclosure. With reference to FIG. 11 and FIG. 12, and based on the apparatus for determining user activity range shown in FIG. 11, the apparatus for determining user activity range shown in FIG. 12 further includes:

a geographical location marking module 700, configured to mark, on the map after the geographical location information of the user corresponding to the first state is determined, a geographical location corresponding to the geographical location information of the user corresponding to the first state.

Figure 13:
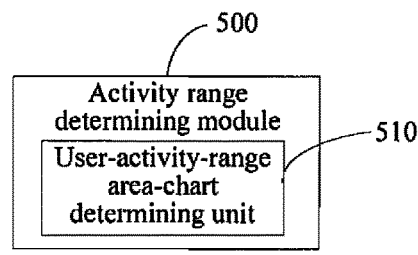
FIG. 13 is a structural block diagram of an activity range determining module according to an embodiment of the present disclosure.

Correspondingly, FIG. 13 shows an optional structure of an activity range determining module 500. Referring to FIG. 13, the activity range determining module 500 may include:

a user-activity-range area-chart determining unit 510, configured to combine a geographical location of the user corresponding to the first state that is marked by the geographical location marking module 700 on the map in the first predetermined time period with the moving route drawn by the moving route drawing module 600 on the map, so as to draw a user activity range area chart.

Figure 14:
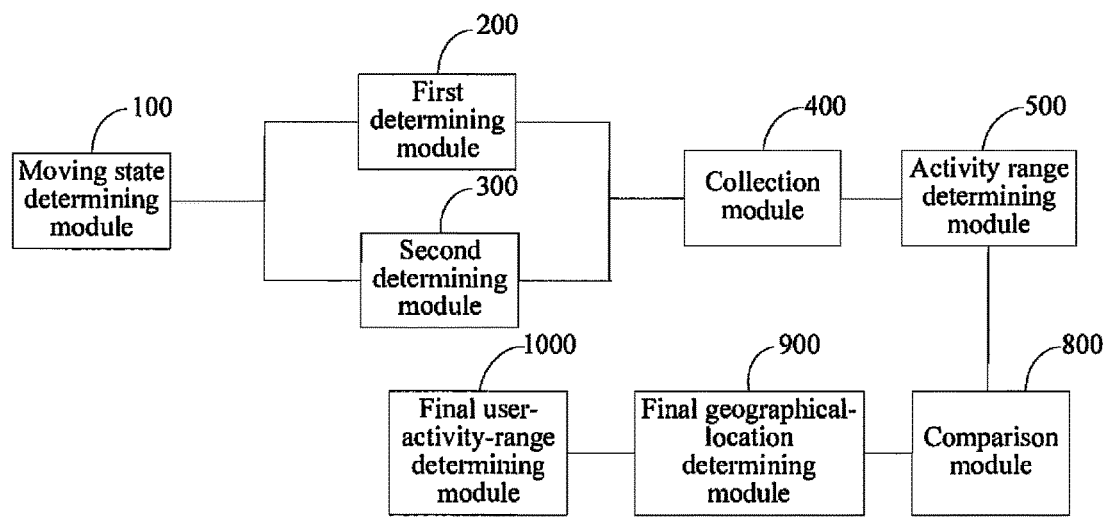
FIG. 14 is yet another structural block diagram of an apparatus for determining user activity range according to an embodiment of the present disclosure.

Optionally, FIG. 14 shows still another structure of an apparatus for determining user activity range according to an embodiment of the present disclosure. With reference to FIG. 8 and FIG. 14, the apparatus for determining user activity range according to the embodiment of the present disclosure may further include:

a comparison module 800, configured to compare user activity ranges that are determined in a set number of first predetermined time periods, and determine a user activity range once in each first predetermined time period;

a final geographical-location determining module 900, configured to determine, in the user activity ranges that are determined in the set number of first predetermined time periods, that geographical location information of the user that has an occurrence frequency exceeding a threshold and is determined in the first state is final geographical location information, and a geographical location information set of the user that has an occurrence frequency exceeding a threshold and is determined in the second state is a final geographical location information set; and a final user-activity-range determining module 1000, configured to combine the final geographical location information with the final geographical location information set, so as to determine a final user activity range.

Figure 15:
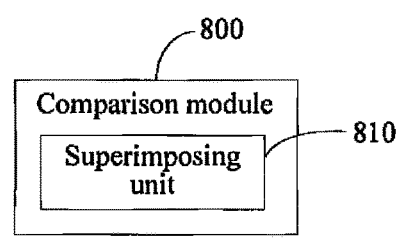
FIG. 15 is a structural block diagram of a comparison module according to an embodiment of the present disclosure.

Correspondingly, FIG. 15 shows an optional structure of a comparison module 800. Referring to FIG. 15, the comparison module 800 may include:

a superimposing unit 810, configured to superimpose, on the map, user activity range area charts corresponding to user activity ranges that are determined in the set number of first predetermined time periods and whose number corresponds to the set number.

Figure 16:
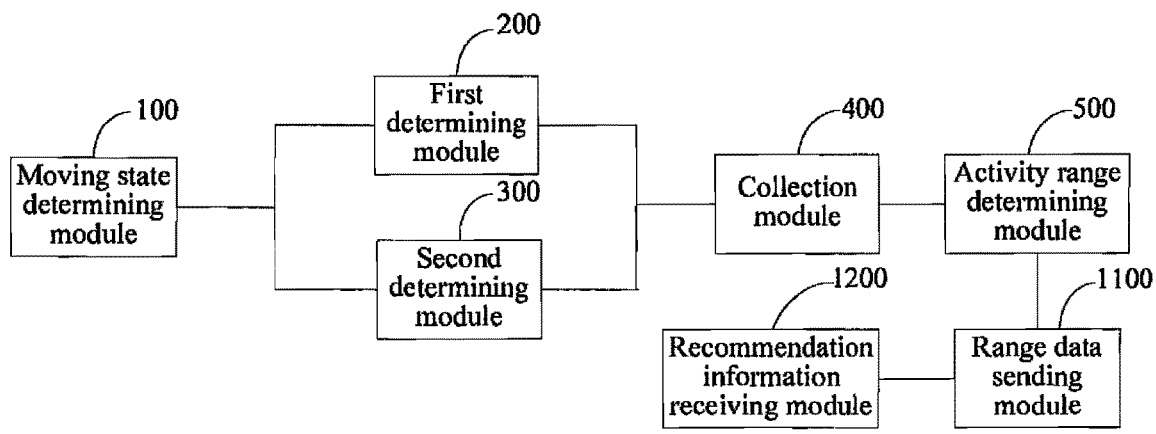
FIG. 16 is still yet another structural block diagram of an apparatus for determining user activity range according to an embodiment of the present disclosure.

Optionally, FIG. 16 shows still yet another structure of an apparatus for determining user activity range according to an embodiment of the present disclosure. With reference to FIG. 8 and FIG. 16, the apparatus for determining user activity range according to the embodiment of the present disclosure may further include:

a range data sending module 1100, configured to send, to a server, data corresponding to the user activity range after the user activity range is determined; and a recommendation information receiving module 1200, configured to receive recommendation information corresponding to the data that corresponds to the user activity range and is sent by the server.

The apparatus for determining user activity range provided in the embodiment of the present disclosure can automatically determine a user activity range in a moving process of a user, and can accurately determine a specific geographical location in the user activity range by using a positioning technology, thereby automatically and accurately determining the user activity range.

An embodiment of the present disclosure further provides a terminal device. The terminal device may include the foregoing apparatus for determining user activity range. For description of the apparatus for determining user activity range, reference may be made to description of corresponding parts in FIG. 8 to FIG. 16, and details are not described herein again.

In the embodiments of the present disclosure, automatic and accurate determining of a user activity range is achieved, and based on this, accurate recommendation of information is achieved.

The embodiments in this specification are all described in a progressive manner. Description of each of the embodiments focuses on differences from other embodiments, and mutual reference may be made for the same or similar parts among respective embodiments. The apparatuses disclosed in the embodiments substantially correspond to the methods disclosed in the embodiments and therefore are only briefly described, and reference may be made to the description of the part of the methods for related parts.

A person of ordinary skill in the art may further be aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether these functions are performed by hardware or software depends on the particular applications and design constraint conditions of the technical solution. A person skilled in the art may use different methods to implement the described functions for each particular application, but it should not be considered that the implementation goes beyond the scope of the present disclosure.

The steps of the method or algorithm described with reference to the embodiments disclosed in this specification can be directly implemented by using hardware, or a software module executed by a processor, or implemented by a combination thereof. The software module may be disposed in a random access memory (RAM), a memory, a read-only memory (ROM), an electrically programmable ROM, an electrically erasable programmable ROM, a register, a hard disk, a removable magnetic disk, a CD-ROM, or any other type of storage medium commonly known in the art.

The foregoing description of the disclosed embodiments enables a person skilled in the art to implement or use the present disclosure. Multiple modifications to these embodiments are apparent for a person skilled in the art. The general principle defined in this specification can be implemented in other embodiments without departing from the spirit or scope of the present disclosure. Therefore, the present disclosure is not limited to these embodiments described in this specification, but extends to the widest scope that complies with the principle and novelty disclosed in this specification.

What is claimed is:

1. A method for determining user activity range, comprising:

determining a moving state of a user, wherein the moving state comprises a first state and a second state, wherein an average moving speed of the user in the second state is greater than an average moving speed of the user in the first state;

determining, when the moving state of the user is the first state, geographical location information of the user corresponding to the first state;

determining, when the moving state of the user is the second state, a geographical location information set of the user corresponding to the second state, wherein the geographical location information set is formed by multiple pieces of geographical location information of the user that are determined according to a time sequence during the second state;

collecting, in a first predetermined time period, geographical location information of the user corresponding to the first state, and a geographical location information set of the user corresponding to the second state, and combining the geographical location information of the user determined in the first state in the first predetermined time period with the geographical location information set of the user determined in the second state in the first predetermined time period, so as to determine a user activity range;

determining, during the second state, geographical location information of the user once in each third predetermined time period, until the moving state of the user changes into the first state; and aggregating the multiple pieces of geographical location information that are determined according to the time sequence during the second state, so as to form the geographical location information set.

2. The method for determining user activity range according to claim 1, wherein the process of determining a moving state of a user comprises:

detecting a moving speed of the user;

determining that the moving state of the user is the first state if the detected moving speed of the user is less than a predetermined speed threshold for a time duration greater than a second predetermined time period threshold; and determining that the moving state of the user is the second state if the detected moving speed of the user is greater than the predetermined speed threshold for a time duration greater than the second predetermined time period threshold.

3. The method for determining user activity range according to claim 1, wherein the method further comprises:

marking, on a map, geographical locations corresponding to the geographical location information in the geographical location information set, and connecting, according to the time sequence in which the geographical location information in the geographical location information set is determined, the corresponding geographical locations marked on the map, so as to draw a moving route of the user.

4. The method for determining user activity range according to claim 3, wherein the method further comprises:

marking, on the map after determining the geographical location information of the user corresponding to the first state, a geographical location corresponding to the geographical location information of the user corresponding to the first state; and the combining the geographical location information of the user determined in the first state in the first predetermined time period with the geographical location information set of the user determined in the second state in the first predetermined time period, so as to determine a user activity range comprises:

combining a geographical location of the user corresponding to the first state that is marked on the map in the first predetermined time period with the moving route drawn on the map, so as to draw a user activity range area chart.

5. The method for determining user activity range according to claim 1, wherein the method further comprises:

comparing user activity ranges that are determined in a set number of first predetermined time periods, and determining user activity range once in each first predetermined time period;

determining, in the user activity ranges that are determined in the set number of first predetermined time periods, that geographical location information of the user that has an occurrence frequency exceeding a threshold and is determined in the first state is final geographical location information, and a geographical location information set of the user that has an occurrence frequency exceeding a threshold and is determined in the second state is a final geographical location information set; and combining the final geographical location information with the final geographical location information set, so as to determine a final user activity range.

6. The method for determining user activity range according to claim 5, wherein the comparing user activity ranges that are determined in a set number of first predetermined time periods comprises:

superimposing, on the map, user activity range area charts corresponding to user activity ranges that are determined in the set number of first predetermined time periods and whose number corresponds to the set number.

7. The method for determining user activity range according to claim 1, wherein the method further comprises:

sending, to a server, data corresponding to the user activity range after the user activity range is determined; and receiving recommendation information corresponding to the data that corresponds to the user activity range and is sent by the server.

8. An apparatus for determining user activity range, comprising:

one or more modules consisting of processor-executable instructions, the one or more modules comprising:

a moving state determining module, configured to determine a moving state of a user, wherein the moving state comprises a first state and a second state, wherein an average moving speed of the user in the second state is greater than an average moving speed of the user in the first state;

a first determining module, configured to determine, when the moving state of the user is the first state, geographical location information of the user corresponding to the first state;

a second determining module, configured to determine, when the moving state of the user is the second state, a geographical location information set of the user corresponding to the second state, wherein the geographical location information set is formed by multiple pieces of geographical location information of the user that are determined according to a time sequence during the second state;

a collection module, configured to collect, in a first predetermined time period, geographical location information of the user corresponding to the first state, and a geographical location information set of the user corresponding to the second state; and an activity range determining module, configured to combine the geographical location information of the user determined in the first state in the first predetermined time period with the geographical location information set of the user determined in the second state in the first predetermined time period, so as to determine a user activity range;

wherein the second determining module further comprises:

a timing determining unit, configured to determine, during the second state, geographical location information of the user once in each third predetermined time period, until the moving state of the user changes into the first state; and an aggregation unit, configured to aggregate the multiple pieces of geographical location information that are determined according to the time sequence during the second state, so as to form the geographical location information set.

9. The apparatus for determining user activity range according to claim 8, wherein the moving state determining module comprises:

a moving speed detection unit, configured to detect a moving speed of the user;

a first determining unit, configured to determine that the moving state of the user is the first state if the detected moving speed of the user is less than a predetermined speed threshold for a time duration greater than a second predetermined time period threshold; and a second determining unit, configured to determine that the moving state of the user is the second state if the detected moving speed of the user is greater than the predetermined speed threshold for a time duration greater than the second predetermined time period threshold.

10. The apparatus for determining user activity range according to claim 8, wherein the apparatus further comprises:

a moving route drawing module, configured to mark, on a map, geographical locations corresponding to the geographical location information in the geographical location information set, and connect, according to the time sequence in which the geographical location information in the geographical location information set is determined, the corresponding geographical locations marked on the map, so as to draw a moving route of the user.

11. The apparatus for determining user activity range according to claim 10, wherein the apparatus further comprises:

a geographical location marking module, configured to mark, on the map after the geographical location information of the user corresponding to the first state is determined, a geographical locations corresponding to the geographical location information of the user corresponding to the first state; and the activity range determining module comprises:

a user-activity-range area-chart determining unit, configured to combine a geographical location of the user corresponding to the first state that is marked on the map in the first predetermined time period with the moving route drawn on the map, so as to draw a user activity range area chart.

12. The apparatus for determining user activity range according to claim 8, wherein the apparatus further comprises:

a comparison module, configured to compare user activity ranges that are determined in a set number of first predetermined time periods, and determine a user activity range once in each first predetermined time period;

a final geographical-location determining module, configured to determine, in the user activity ranges that are determined in the set number of first predetermined time periods, that geographical location information of the user that has an occurrence frequency exceeding a threshold and is determined in the first state is final geographical location information, and a geographical location information set of the user that has an occurrence frequency exceeding a threshold and is determined in the second state is a final geographical location information set; and a final user-activity-range determining module, configured to combine the final geographical location information with the final geographical location information set, so as to determine a final user activity range.

13. The apparatus for determining user activity range according to claim 12, wherein the comparison module comprises:

a superimposing unit, configured to superimpose, on the map, user activity range area charts corresponding to user activity ranges that are determined in the set number of first predetermined time periods and whose number corresponds to the set number.

14. The apparatus for determining user activity range according to claim 8, wherein the apparatus further comprises:

a range data sending module, configured to send, to a server, data corresponding to the user activity range after the user activity range is determined; and a recommendation information receiving module, configured to receive recommendation information corresponding to the data that corresponds to the user activity range and is sent by the server.

* * * * *